United States Patent
Ishikawa et al.

(10) Patent No.: US 6,352,247 B1
(45) Date of Patent: Mar. 5, 2002

(54) MOUNTING STRUCTURE OF COMPRESSOR FOR VEHICLE AIR CONDITIONER TO VEHICLE

(75) Inventors: Hiroshi Ishikawa, Hazu-gun; Kunio Iritani, Anjo; Katsuya Kusano, Chita-gun; Masaya Tanaka, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/461,856

(22) Filed: Dec. 15, 1999

(30) Foreign Application Priority Data

Dec. 17, 1998 (JP) .......................... 10-359542
Oct. 7, 1999 (JP) .......................... 11-287209

(51) Int. Cl.$^7$ .................................. F16F 5/00
(52) U.S. Cl. ............... 267/140.11; 62/295; 248/638
(58) Field of Search .................. 267/140, 139, 267/153, 140.11, 152, 292; 181/403; 137/899.4; 62/295, 297, 239; 417/363; 248/615, 560, 561, 636, 638

(56) References Cited

U.S. PATENT DOCUMENTS

| | | | |
|---|---|---|---|
| 1,808,939 A | * 6/1931 | Summers | 62/296 |
| 2,270,335 A | * 1/1942 | Parkinson et al. | 248/21 |
| 2,930,556 A | * 3/1960 | Horlacher | 248/15 |
| 3,465,954 A | * 9/1969 | Ellis | 230/235 |
| 3,476,309 A | * 11/1969 | Harlin | 230/235 |
| 3,814,357 A | * 6/1974 | Rontgen | 248/20 |
| 3,866,867 A | * 2/1975 | LaRocca | 248/23 |
| 4,174,189 A | * 11/1979 | Elson | 417/363 |
| 4,452,418 A | * 6/1984 | Urushigara et al. | 248/666 |
| 4,600,367 A | * 7/1986 | Terauchi et al. | 417/360 |
| 4,834,336 A | * 5/1989 | Shimazaki et al. | 248/666 |
| 4,871,300 A | * 10/1989 | Outzen | 417/363 |
| 4,891,955 A | * 1/1990 | Klausing et al. | 62/295 |
| 4,993,682 A | * 2/1991 | Imai et al. | 248/638 |
| 5,040,953 A | * 8/1991 | Tinsler | 417/363 |
| 5,052,530 A | * 10/1991 | Shimazaki | 188/379 |
| 5,090,657 A | * 2/1992 | Dreiman | 248/624 |
| 5,221,192 A | * 6/1993 | Heflin et al. | 417/363 |
| 5,277,554 A | * 1/1994 | Elson | 417/363 |
| 5,342,179 A | * 8/1994 | Dreiman | 417/363 |
| 5,386,962 A | * 2/1995 | Adriance et al. | 248/624 |
| 5,810,322 A | * 9/1998 | Zhao et al. | 248/675 |
| 5,913,892 A | * 6/1999 | Kwon | 62/296 |
| 5,953,932 A | * 9/1999 | Kwon | 62/297 |
| 6,029,942 A | * 2/2000 | Daddis, Jr. et al. | 248/635 |

FOREIGN PATENT DOCUMENTS

JP    A-3-134269    6/1991

* cited by examiner

*Primary Examiner*—Matthew C. Graham
*Assistant Examiner*—Benjamin A. Pezzlo
(74) *Attorney, Agent, or Firm*—Harness, Dickey & Pierce, PLC

(57) ABSTRACT

An electric compressor having a compression unit and an electric motor is mounted to a vehicle through a first support member supporting the compression unit and a second support member supporting the motor. A spring constant of the first support member is smaller than that of the second support member. Therefore, vibration of the compression unit is absorbed by the first support member, and is restricted from being transmitted to the vehicle. On the other hand, vibration of the vehicle is absorbed by the second support member, and is restricted from being transmitted to the compressor. As a result, inlet and outlet pipes connected to the compressor are insulated from a large amount of stress and therefore are not broken due to fatigue at an early stage.

5 Claims, 13 Drawing Sheets

MOUNTING STRUCTURE OF COMPRESSOR FOR VEHICLE AIR CONDITIONER TO VEHICLE

CROSS REFERENCE TO RELATED APPLICATIONS

This application relates to and claims priority from Japanese Patent Application Nos. 10-359542 filed on Dec. 17, 1998 and 11-287209 filed on Oct. 7, 1999, the contents of which are hereby incorporated by reference.

BACKGROUND OF THE INVENTION

1. Field of the Invention

The present invention relates generally to compressors, and particularly to a mounting structure of an electric compressor for a vehicle air conditioner.

2. Related Art

Conventionally, an electric compressor is mounted to a vehicle body through an elastic support member made of material such as rubber so that vibration of the compressor is restricted from being transmitted to the vehicle body, and vibration of the vehicle body is restricted from being transmitted to the compressor. Vibration of the compressor is effectively restricted from being transmitted to the vehicle body when a spring constant of the elastic support member is decreased so that resonance frequency of a vibration system including the compressor, the elastic support member and the vehicle body is decreased.

However, when the spring constant of the elastic support member is decreased, and vibration of the vehicle is relatively large due to a rough road or the like, the vibration of the vehicle may be transmitted to the compressor, and the compressor may greatly vibrate. As a result, a large amount of stress may be applied to inlet and outlet pipes connected to the compressor thereby causing the pipes to break.

The pipes may be insulated from such stress by increasing the spring constant of the elastic support member, or by directly connecting the compressor to the vehicle body using a connector or the like so that the vehicle body and the compressor harmonically vibrate. However, in this case, vibration of the compressor may be transmitted to the vehicle body, and especially to a steering wheel, and resulting in driver discomfort.

SUMMARY OF THE INVENTION

In view of the foregoing problems, it is an object of the present invention to provide a mounting structure of a compressor in which vibration of the compressor is restricted from being transmitted to the vehicle, and vibration of the vehicle is restricted from being transmitted to the compressor, so that pipes connected to the compressor are restricted from being broken due to vibration-related fatigue.

According to the present invention, a compressor has a compression unit and a motor integrally connected to the compression unit for driving the compression unit. The compressor is mounted to a vehicle through elastically deformable first and second support members. The first support member supports the compression unit and is secured to the vehicle, and the second support member supports the motor and is secured to the vehicle. Resonance frequency of the first support member is set to approximately 15–25 Hz, and resonance frequency of the second support member is set to approximately 26–40 Hz.

As a result, vibration of the compression unit is absorbed by the first support member, and is restricted form being transmitted to the vehicle. On the other hand, vibration of the vehicle is absorbed by the second support member, and is restricted from being transmitted to the compressor. As a result, a large amount of stress is not applied to the inlet and outlet pipes connected to the compressor.

Preferably, a hardness of the first support member is set to approximately IRHD 40–53, and a hardness of the second support member is set to approximately IRHD 54–70. As a result, vibration of the compressor is further restricted from being transmitted to the vehicle, and vibration of the vehicle is further restricted from being transmitted to the compressor.

More preferably, a third support member secured to the vehicle is secured to the compression unit through an elastically deformable member in the vicinity of an inlet pipe secured to the compression unit. As a result, the inlet pipe is prevented from being greatly displaced and broken.

BRIEF DESCRIPTION OF THE DRAWINGS

These and other objects and features of the present invention will become more readily apparent from a better understanding of the preferred embodiments described below with reference to the accompanying drawings, in which.

DETAILED DESCRIPTION OF THE PREFERRED EMBODIMENTS

Preferred embodiments of the present invention are described hereinafter with reference to the accompanying drawings.

(First Embodiment)

A first preferred embodiment of the present invention will be described with reference to FIGS. 1–4. In the first embodiment, the present invention is applied to an electric compressor in a refrigeration cycle of an air conditioner for an electric vehicle.

Figure 1:
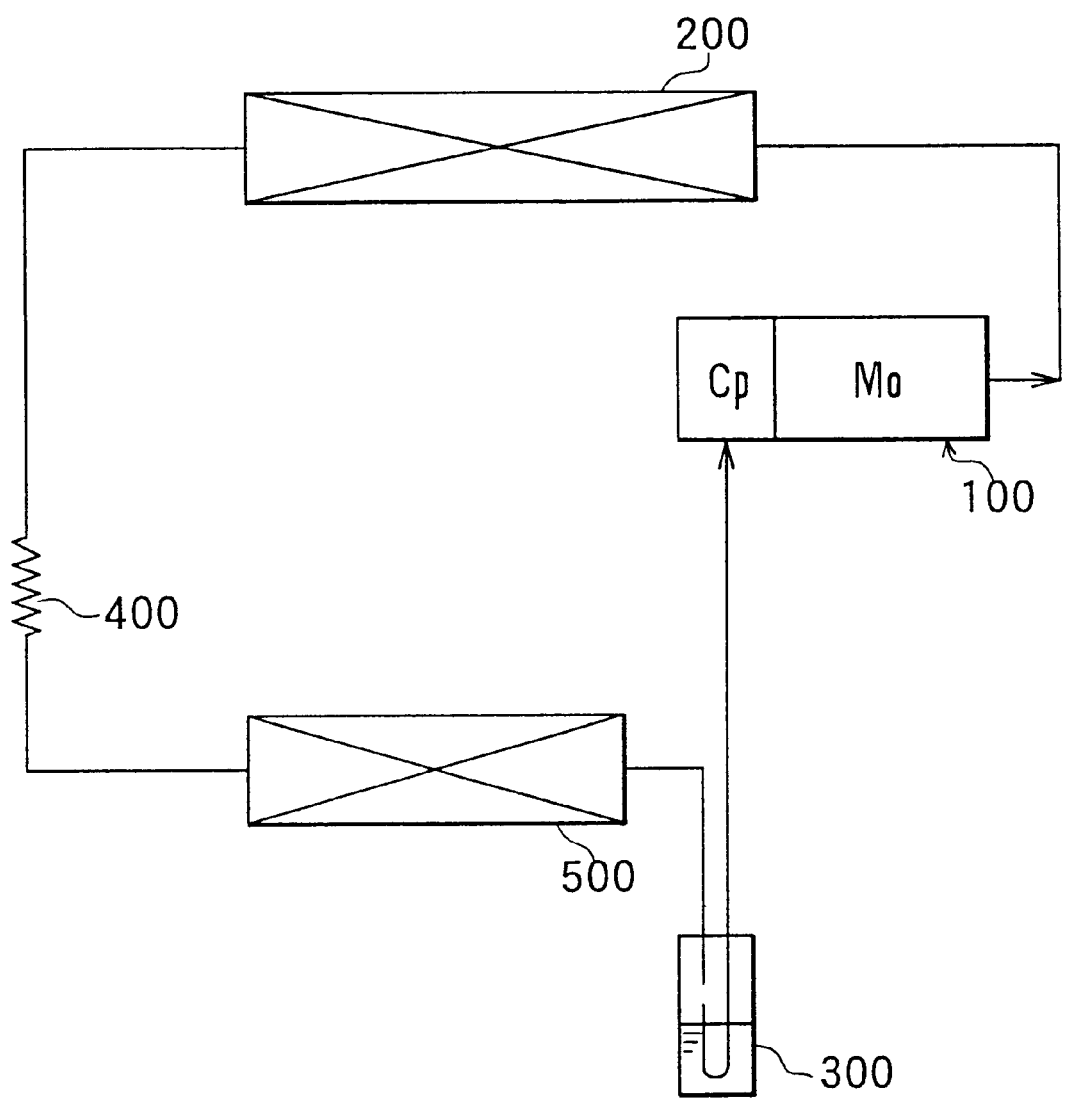
FIG. 1 is a schematic diagram showing a refrigerant cycle for a vehicle air conditioner according to a first preferred embodiment of the present invention.

As shown in FIG. 1, an electric compressor 100 has a compression unit Cp for sucking and compressing refrigerant, and an electric motor Mo for driving the compression unit Cp. The compression unit Cp and the motor Mo are integrally connected with each other. In the first embodiment, the compression unit Cp is a well-known scroll-type compression unit having a stationary scroll portion and a movable scroll portion, and the motor Mo is a direct current brushless motor. A condenser 200 cools refrigerant discharged from the compressor 100. A decompressor 400 decompresses liquid refrigerant discharged from the condenser 200. In the first embodiment, the decompressor 400 is a capillary tube. An evaporator 500 evaporates refrigerant decompressed by the decompressor 400. An accumulator 300 separates refrigerant discharged from the evaporator 500 into gas refrigerant and liquid refrigerant, and stores surplus refrigerant therein.

Next, a mounting structure of the compressor 100 to the vehicle will be described with reference to FIGS. 2A–2C.

Figure 2A:
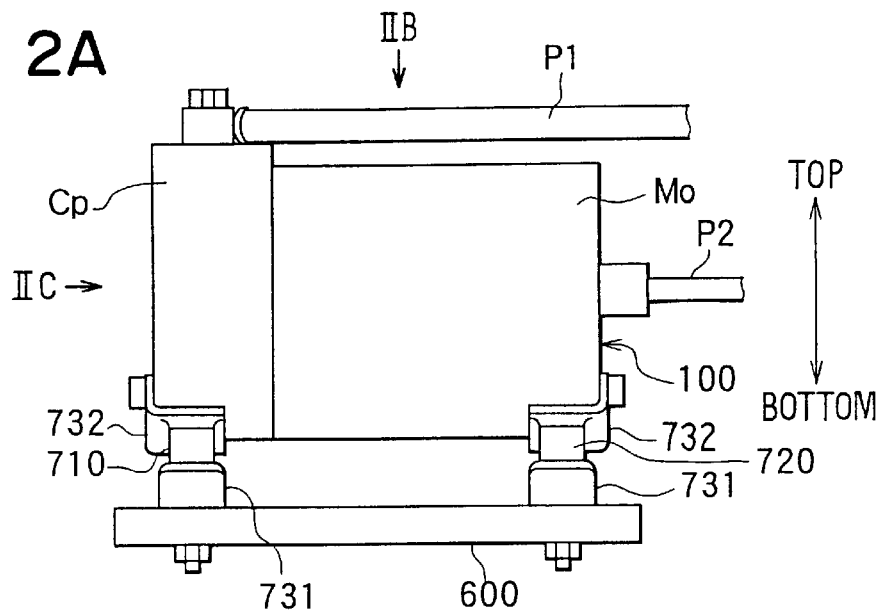
FIG. 2A is a front view showing a compressor mounted to a vehicle body according the first embodiment.

As shown in FIG. 2A, the compressor 100 is mounted to a vehicle body 600 through elastically deformable first and second support members 710, 720 made of rubber. The first support member 710 supports the compression unit Cp and is secured to the vehicle body 600. The second support member 720 supports the motor Mo and is secured to the vehicle body 600. A hardness of the first support member 710 is set to approximately IRHD 40–53, and a hardness of the second support member 720 is set to approximately IRHD 54–70 so that a spring constant of the first support member 710 is smaller than that of the second support member 720. As a result, resonance frequency of the first support member 710 is approximately 15–25 Hz, and resonance frequency of the second support member 720 is approximately 26–40 Hz.

The resonance frequency of the first support member 710 is determined according to mass and the spring constant of the first support member 710. The mass of the first support member 710 is calculated by dividing load (N) applied to the first support member 710 when the vehicle and the compressor 100 come to rest by gravitational acceleration (m/sec$^2$), while the first and second support members 710, 720 are disposed below the compressor 100 in a vertical direction. The resonance frequency of the second support member 720 is also determined similarly to that of the first support member 710. In the first embodiment, the hardness of the first support member 710 is set to IRHD 45, and the hardness of the second support member 720 is set to IRHD 65. As a result, the resonance frequency of the first support member 710 is 20 Hz, and the resonance frequency of the second support member 720 is 34 Hz.

Figure 2B:
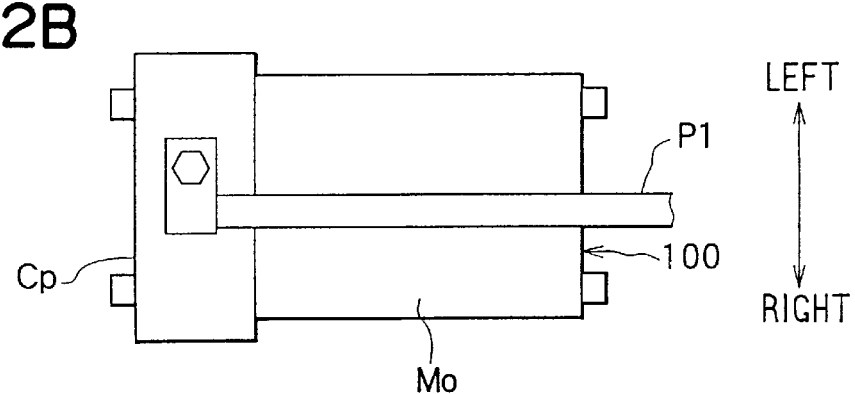
FIG. 2B is a top view taken from arrow IIB in FIG. 2A.

As shown in FIGS. 2A and 2B, a metal inlet pipe P1 and a metal outlet pipe P2 are connected to the compressor 100. The inlet pipe P1 is connected to an outlet of the evaporator 500, and the outlet pipe P2 is connected to an inlet of the condenser 200. In the first embodiment, the inlet pipe P1 and the outlet pipe P2 are made of aluminum, and the inlet pipe P1 is connected to the compression unit Cp.

Figure 2C:
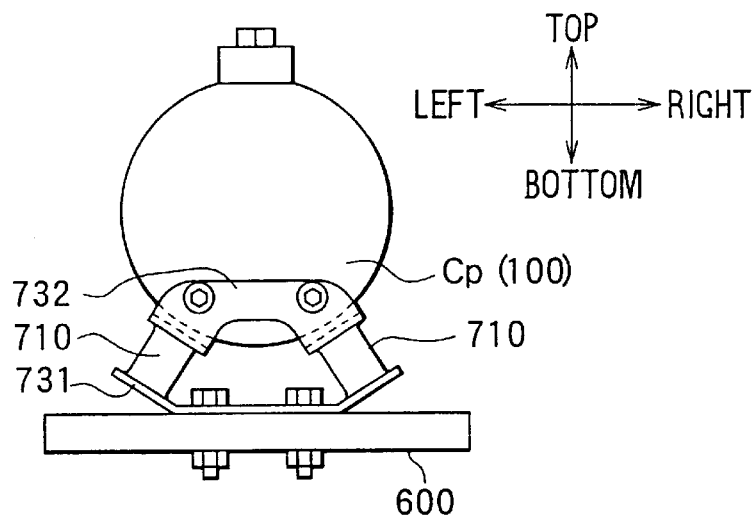
FIG. 2C is a side view taken from arrow IIC in FIG. 2A.

Further, as shown in FIGS. 2A and 2C, each of the first and second support members 710, 720 is secured to the vehicle body 600 and the compressor 100 through a bracket 731 and a bracket 732, respectively. The first and second support members 710, 720 are bonded to the brackets 731, 732 by a vulcanizing agent. Thus, the compressor 100 is secured to the vehicle body 600 through the first and second support members 710, 720 and the brackets 731, 732.

Since the movable scroll portion in the compression unit Cp rotates eccentrically with respect to a rotation shaft thereof, the amplitude of vibration generated by the compression unit Cp is larger than that of the vibration generated by the motor Mo.

According to the first embodiment, the spring constant of the first support member 710 is set smaller than that of the second support member 720. Therefore, the vibration of the compression unit Cp is effectively absorbed by the first support member 710, and is restricted from being transmitted to the vehicle. On the other hand, the vibration of the vehicle is absorbed by the second support member 720 which has the larger spring constant than that of the first support member 710. As a result, the inlet pipe P1 and the outlet pipe P2 are insulated from a large amount of stress. Thus, in the first embodiment, vibration of the compressor 100 is restricted from being transmitted to the vehicle, and vibration of the vehicle is restricted from being transmitted to the compressor.

Figure 3:
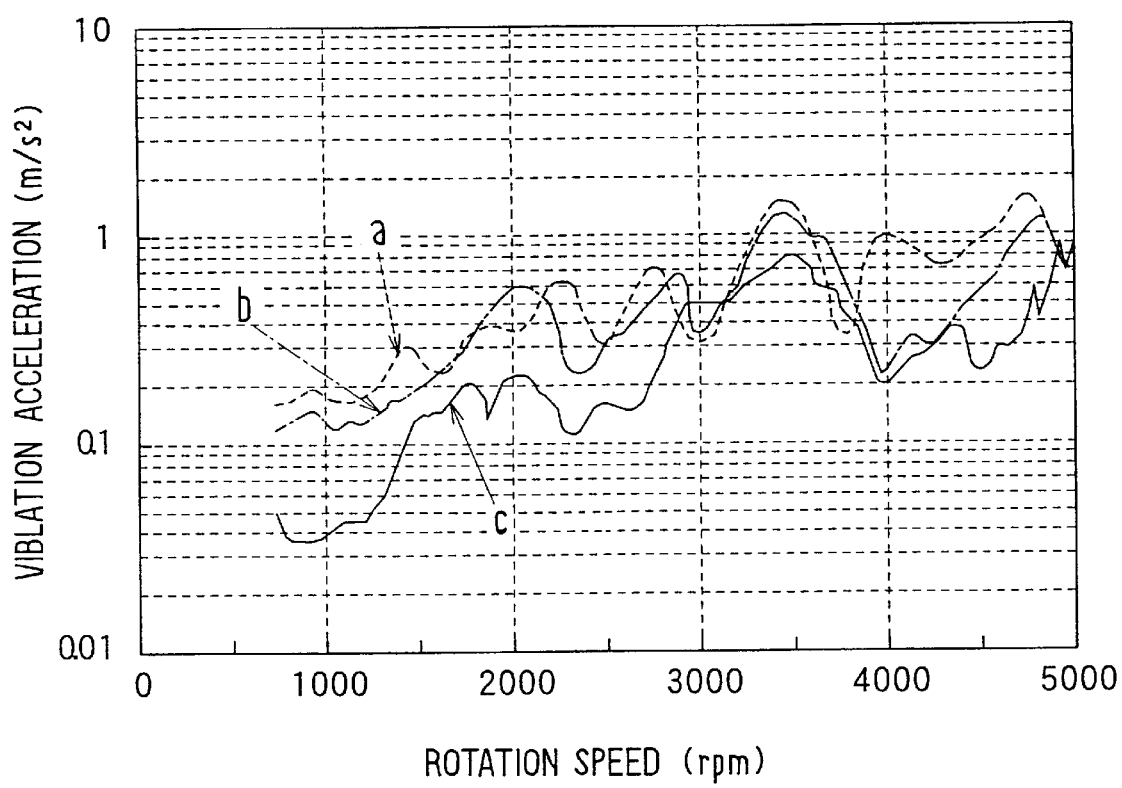
FIG. 3 is a graph showing a relationship between rotation speed of the compressor and vibration acceleration of a steering wheel of a vehicle according to the first embodiment.

Referring to FIG. 3, a relationship between rotation speed of the compressor 100 and vibration acceleration of a steering wheel of the vehicle was measured. In FIG. 3, lines "a", "b" and "c" respectively indicate the hardness of the first support member 710 as IRHD 65, 55 and 45. The hardness of the second support member 720 is IRHD 65 for lines "a", "b" and "c". The resonance frequency of the first support member 710 is respectively 34, 28 and 20 Hz for lines "a", "b" and "c".

As shown in FIG. 3, when the hardness of the first support member 710 is decreased, vibration acceleration of the steering wheel is decreased. The hardness of the first support member 710 changes in proportion to the spring constant thereof. Therefore, when the spring constant of the first support member 710 is decreased, vibration acceleration of the steering wheel is decreased.

Figure 4:
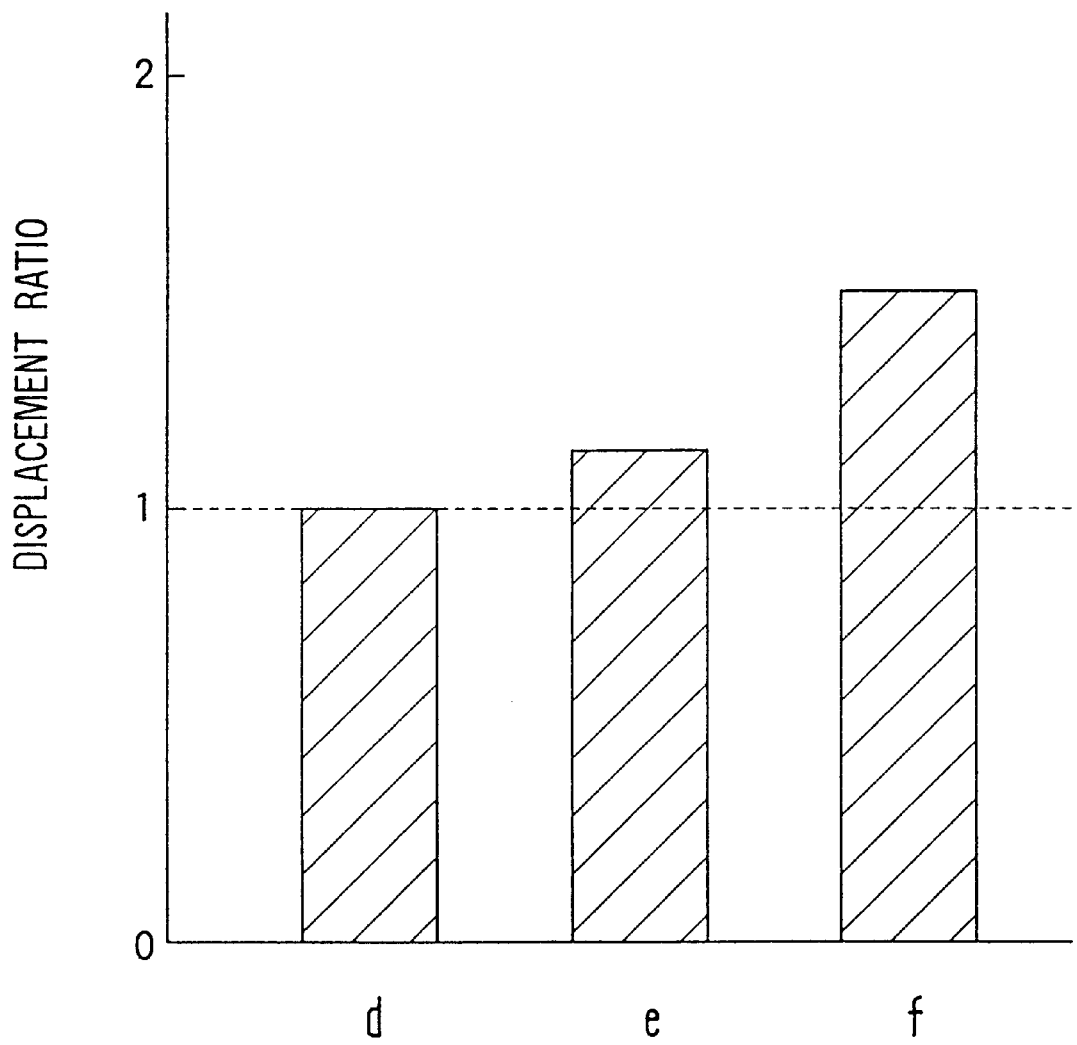
FIG. 4 is a bar graph showing a displacement ratio of an upper portion of the compressor according to the first embodiment.

FIG. 4 shows a displacement ratio of an upper portion of the compressor Cp while a displacement of the upper portion of the compression unit Cp when both the first and second support members 710, 720 have a hardness of IRHD 65 is defined as "1" and indicated by bar "d". In FIG. 4, bar "e" shows the displacement ratio when the first support member 710 has a hardness of IRHD 45 and the second support member 720 has a hardness of IRHD 65, and bar F shows the displacement ratio when both the first and second support members 710, 720 have a hardness of IRHD 45. In bar "d", the resonance frequency of the first support member 710 and the second support member 720 is 34 Hz. In bar "e", the resonance frequency of the first support member 710 is 20 Hz, and the resonance frequency of the second support member 720 is 34 Hz. In bar "f", the resonance frequency of the first support member 710 and the second support member 720 is 20 Hz.

As shown in FIG. 4, the displacement ratio of bar "e" is smaller than that of bar "f". Therefore, when the hardness of the first support member 710 is smaller than that of the second support member 720, that is, when the spring constant of the first support member 710 is smaller than that of the second support member 720, the displacement of the compression unit Cp becomes smaller.

Thus, as shown in FIGS. 3 and 4, when the spring constant of the first support member 710 is smaller than that of the second support member 720, vibration of the vehicle is sufficiently absorbed, and vibration of the compressor 100 is sufficiently restricted from being transmitted to the vehicle.

(Second Embodiment)

A second preferred embodiment of the present invention will be described with reference to FIGS. 5–11. In this and the following embodiments, components which are substantially the same as those in the previous embodiment are assigned the same reference numerals, and the explanation thereof is omitted.

Figure 5A:
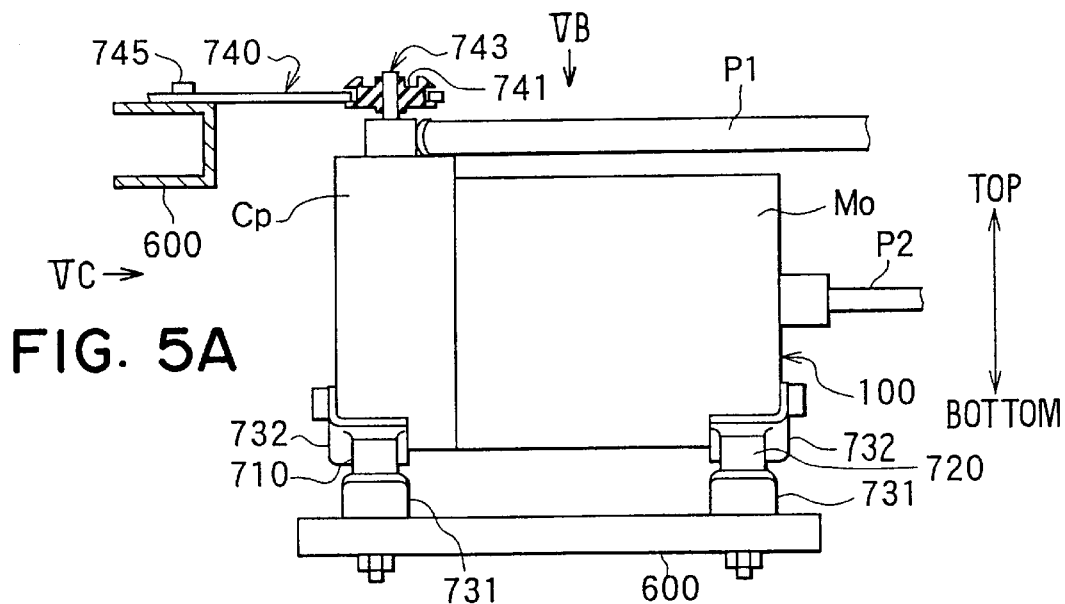
FIG. 5A is a front view showing a compressor mounted to a vehicle body according to a second preferred embodiment of the present invention.
Figure 5B:
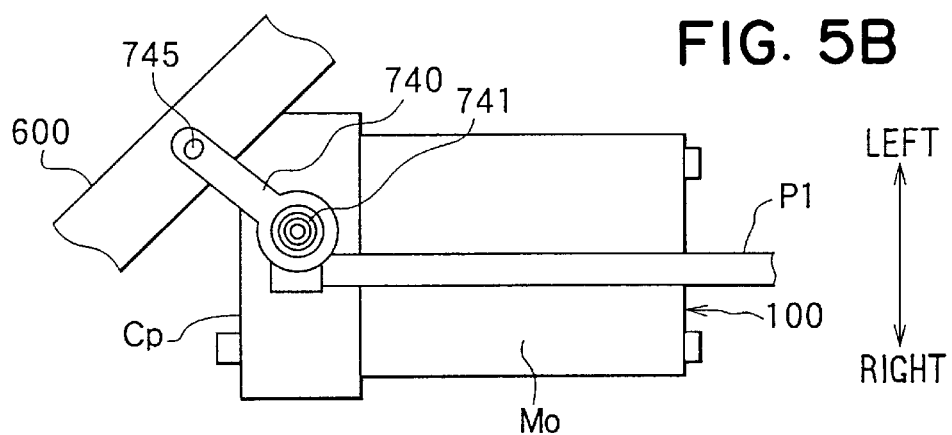
FIG. 5B is a top view taken from arrow VB in FIG. 5A.
Figure 5C:
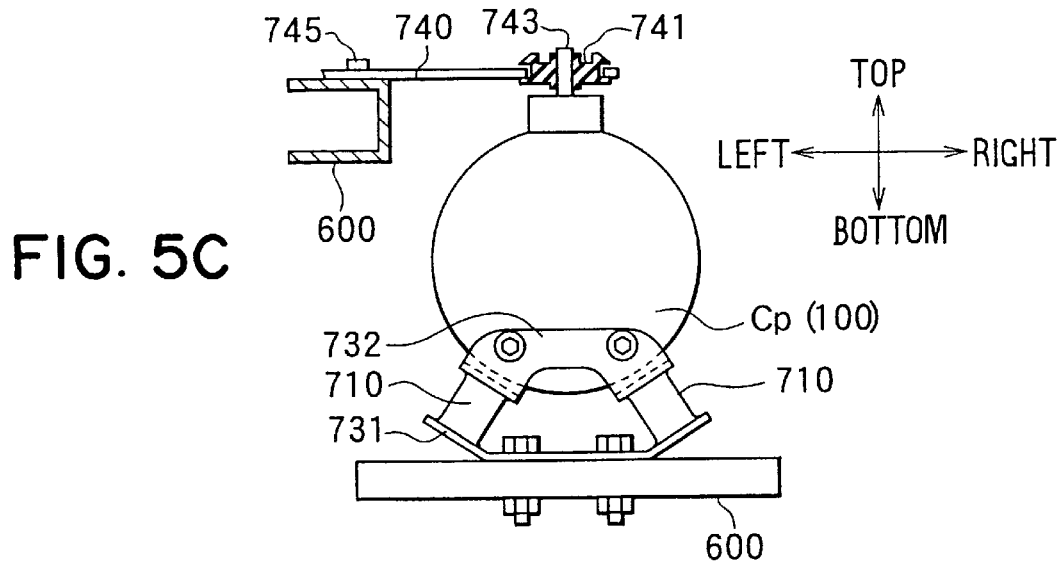
FIG. 5C is a side view taken from arrow VC in FIG. 5A.
Figure 6A:
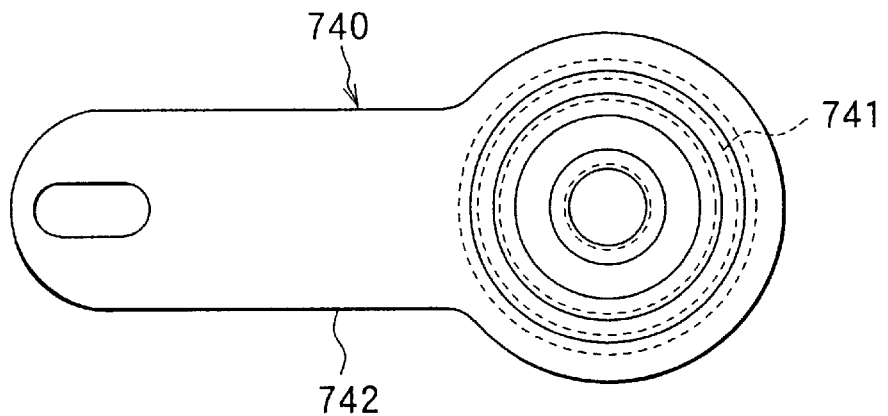
FIG. 6A is a top view showing a vibration restriction bracket according second embodiment.
Figure 6B:
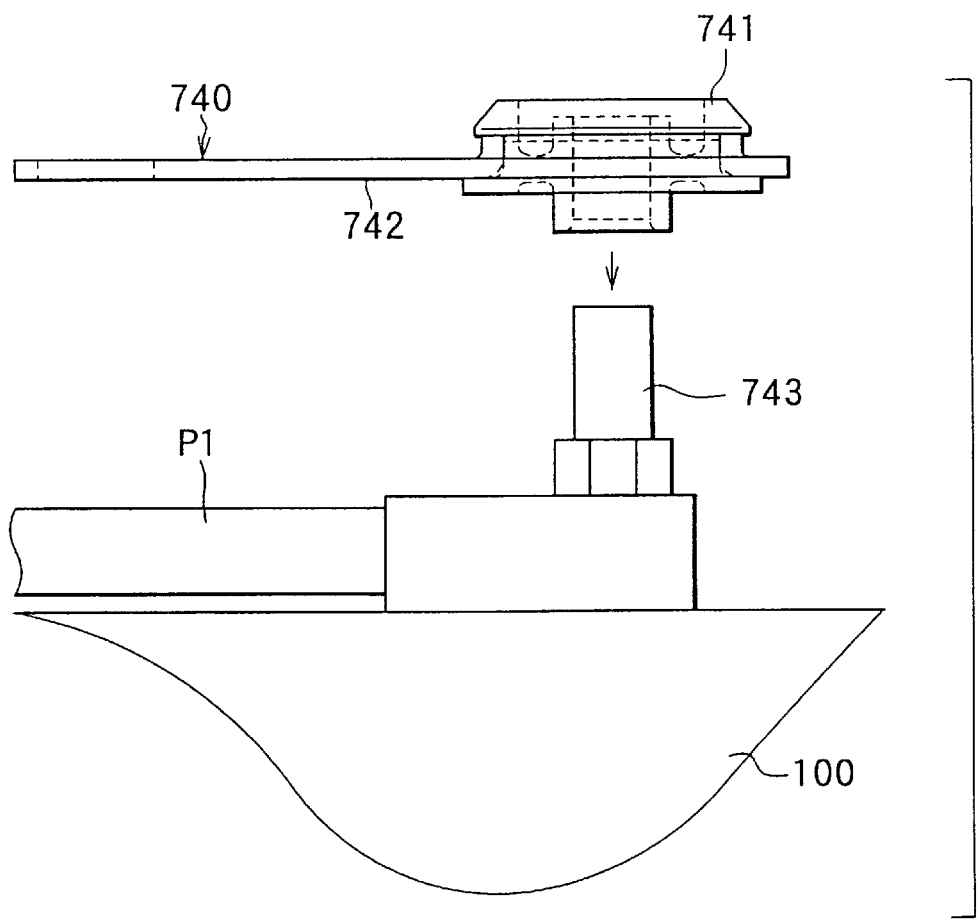
FIG. 6B is a side view showing the vibration restriction bracket and a pin according to the second embodiment.
Figure 7:
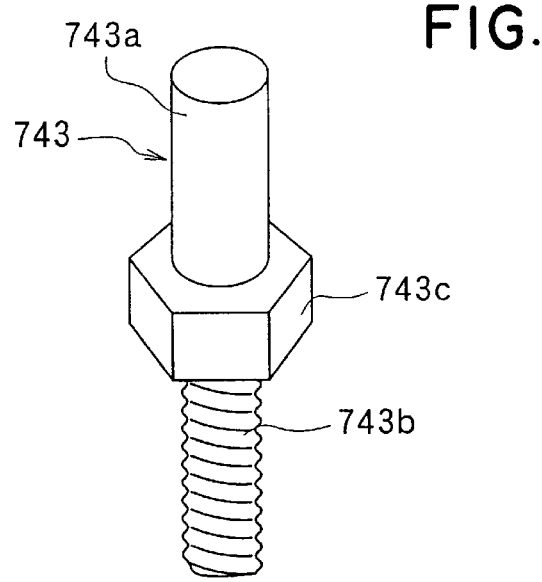
FIG. 7 is a perspective view showing the pin according to the second embodiment.

In the second embodiment, as shown in FIGS. 5A–5C, a vibration restriction bracket 740 for restricting the compressor 100 from vibrating is secured to the compressor 100 in the vicinity of the inlet pipe P1. As shown in FIG. 6A, the vibration restriction bracket 740 has a metal bracket body 742 and an elastically deformable rubber bushing 741 inserted into and secured to the bracket body 742. As shown in FIGS. 5A–5C, one end of the bracket body 742 in a longitudinal direction thereof is secured to the vehicle body 600 through a bolt 745 or the like. The other end of the bracket body 742 in the longitudinal direction thereof is secured to the compressor 100 through the bushing 741 and a pin 743. The pin 743 is secured to a housing of the compressor 100, and is inserted into the bushing 741. Further, as shown in FIG. 6B, the pin 743 also secures the inlet pipe P1 to the compressor 100. As shown in FIG. 7, the pin 743 has a cylindrical portion 743a at one end thereof, an intermediate nut portion 743c used for turning the pin 743 and a male screw portion 743b at the other end thereof.

According to the second embodiment, the vibration restriction bracket 740 is secured to the compressor 100 in the vicinity of the inlet pipe P1. Therefore, the compressor 100 and the inlet pipe P1 are restricted from being displaced due to vibration of the vehicle. As a result, a large amount of stress is not applied to the inlet pipe P1.

In the first embodiment, since the hardness of the first support member 710 is relatively small, the compression unit Cp may vibrate relatively to a large degree due to vibration of the vehicle. As a result, the inlet pipe P1, which is connected to the compression unit Cp, tends to break due to resulting fatigue.

According to the second embodiment, since the vibration restriction bracket 740 is connected to the compressor 100 in the vicinity of the inlet pipe P1, the inlet pipe P1 is effectively insulated from stress.

In the first and second embodiments, the first and second support members 710, 720 may be metal springs or the like. Further, in the second embodiment, the vibration restriction bracket 740 may be also provided in the vicinity of the outlet pipe P2.

Figure 8:
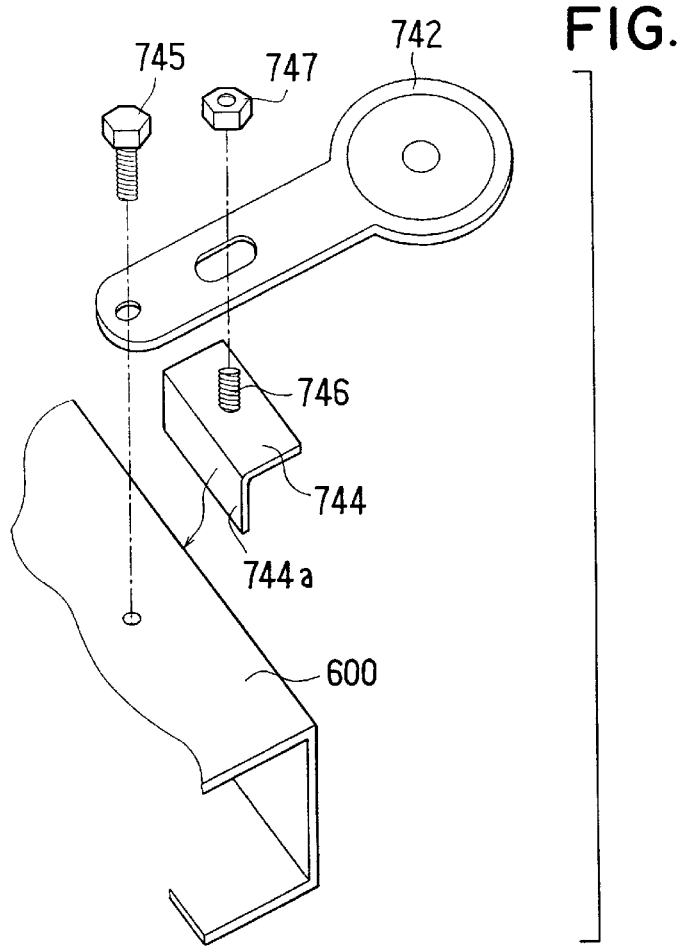
FIG. 8 is a perspective exploded view showing a vibration restriction et, a stopper bracket and a vehicle body according to a modification of the second embodiment.
Figure 9:
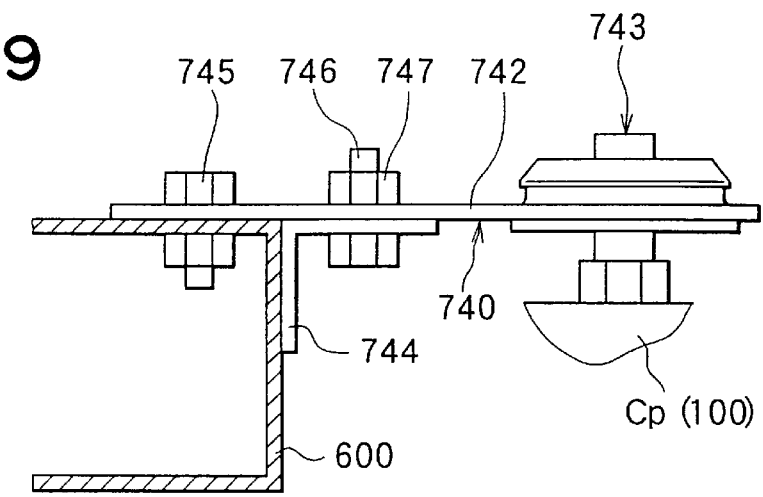
FIG. 9 is a schematic view showing an attachment structure of the vibration restriction bracket to the vehicle body using the stopper bracket in FIG. 8.

In the second embodiment, as shown in FIGS. 8 and 9, the vibration restriction bracket 740 may be secured to the vehicle body 600 using the bolt 745 and a stopper bracket 744 having an L-shaped cross-section. The vibration restriction bracket 740 and the stopper bracket 744 are secured to the vehicle body 600 by a fastening member such as a stud bolt 746 and a nut 747 so that a flat surface 744a of the stopper bracket 744 contacts the vehicle body 600.

Figure 10:
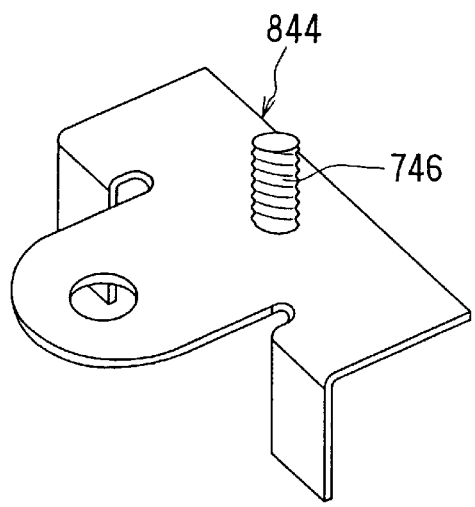
FIG. 10 is a perspective view showing a stopper bracket according to another modification of the second embodiment.
Figure 11:
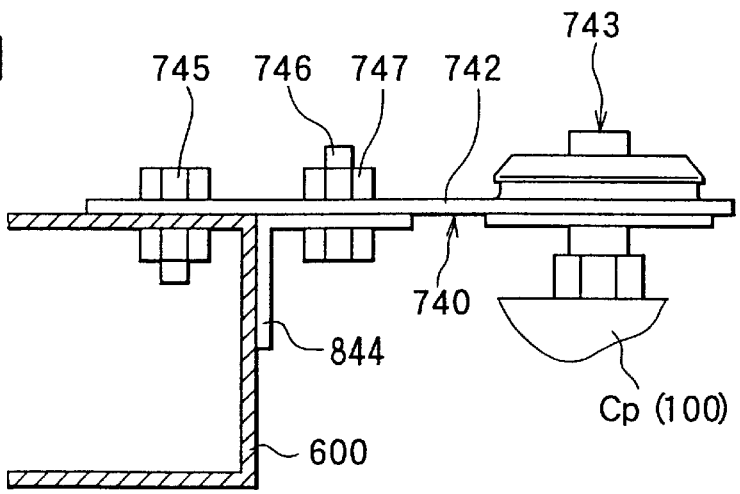
FIG. 11 is a schematic view showing an attachment structure of the vibration restriction bracket to the vehicle body using the stopper bracket in FIG. 10.

Further, as shown in FIGS. 10 and 11, a stopper bracket 844 may be secured to the vehicle body 600 by the bolt 745 together with the vibration restriction bracket 740. As a result, the bolt 745 is not loosened by vibration of the vehicle or vibration of the compressor 100.

(Third Embodiment)

A third preferred embodiment of the present invention will be described with reference to FIGS. 12A–12C.

Figure 12A:
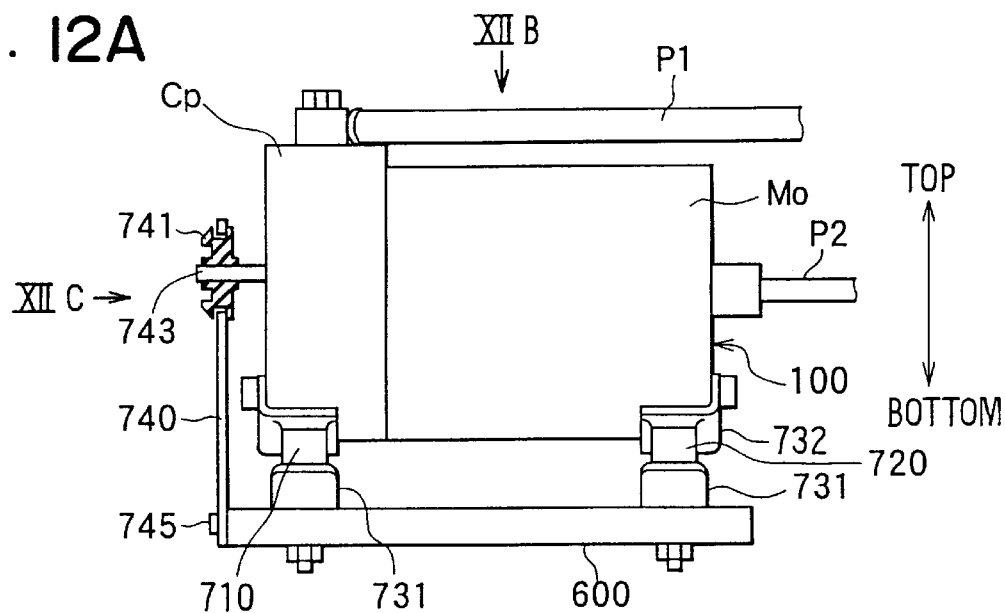
FIG. 12A is a front view showing a compressor mounted to a vehicle according to a third preferred embodiment of the present invention.
Figure 12B:
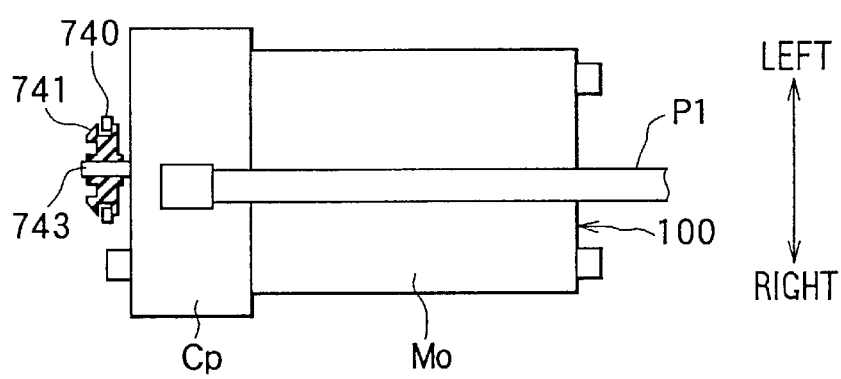
FIG. 12B is a top view taken from arrow XIIB in FIG. 12A.
Figure 12C:
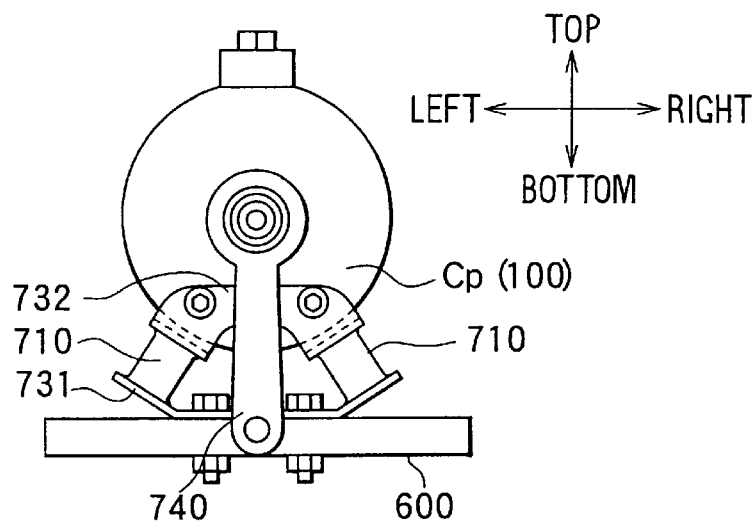
FIG. 12C is a side view taken from arrow XIIC in FIG. 12A.

In the third embodiment, as shown in FIGS. 12A–12C, the vibration restriction bracket 740 is connected to the compression unit Cp.

According to the third embodiment, displacement of the compressor 100 with respect to the vehicle body 600 is restricted from exceeding a predetermined maximum value. Therefore, a large amount of stress is not applied to the inlet pipe P1 and the outlet pipe P2.

(Fourth Embodiment)

A fourth preferred embodiment of the present invention will be described with reference to FIGS. 13A–13C.

Figure 13A:
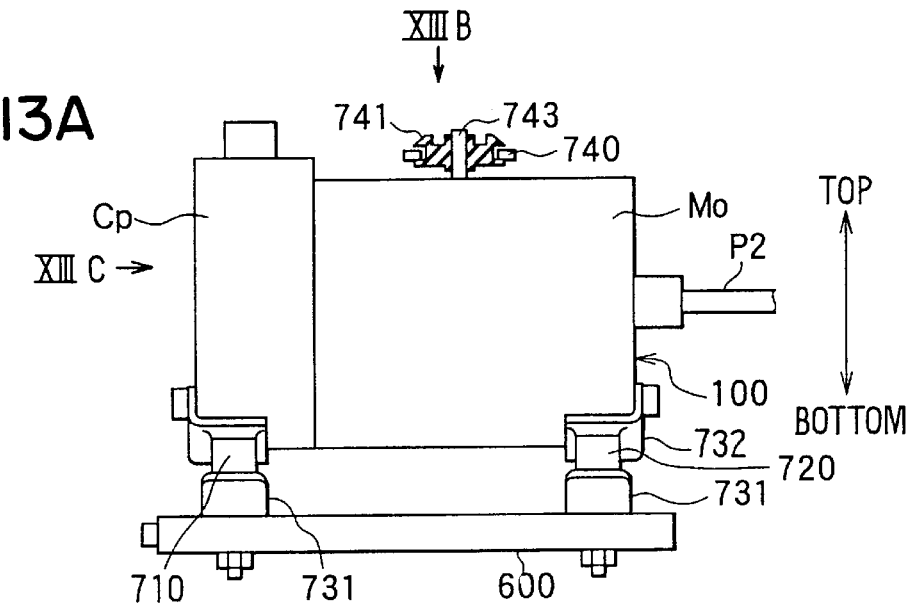
FIG. 13A is a front view showing a compressor mounted to a vehicle according to a fourth preferred embodiment of the present invention.
Figure 13B:
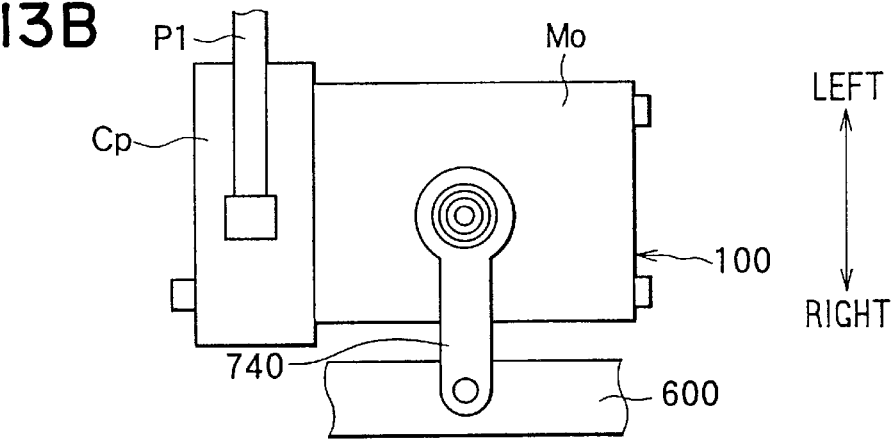
FIG. 13B is a top view taken from arrow XIIIB in FIG. 13A.
Figure 13C:
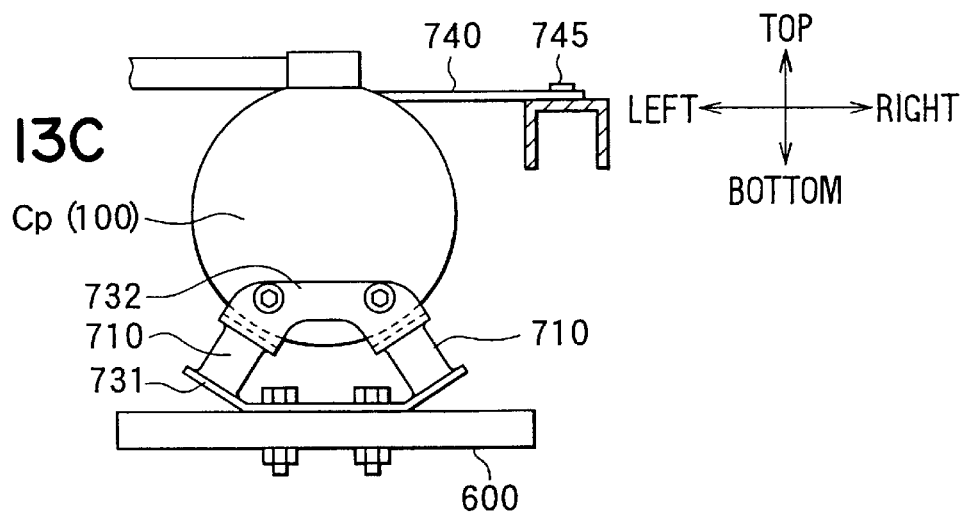
FIG. 13C is a side view taken from arrow XIIIC in FIG. 13A.

In the fourth embodiment, as shown in FIGS. 13A–13C, the vibration restriction bracket 740 is connected to the housing of the compressor 100 in the vicinity of the motor Mo.

According to the fourth embodiment, as with the third embodiment, the displacement of the compressor 100 with respect to the vehicle body 600 is restricted from exceeding the predetermined maximum value. Therefore, the inlet pipe P1 and the outlet pipe P2 are not subjected to a large amount of stress.

(Fifth Embodiment)

A fifth preferred embodiment of the present invention will be described with reference to FIGS. 14A–15.

Figure 14A:
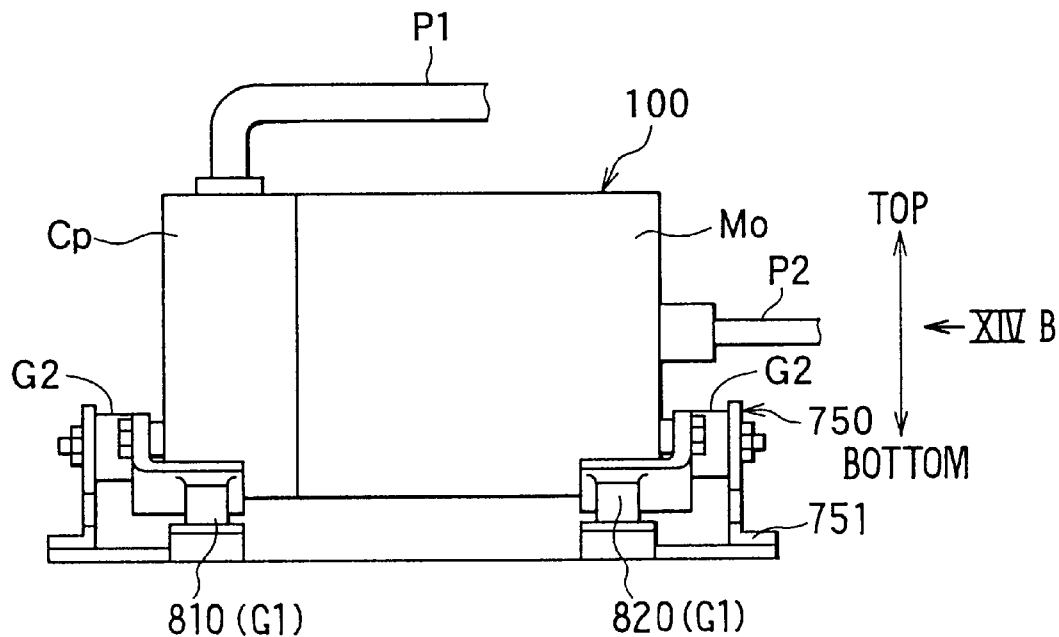
FIG. 14A is a front view showing a compressor mounted to a vehicle according to a fifth preferred embodiment of the present invention.
Figure 14B:
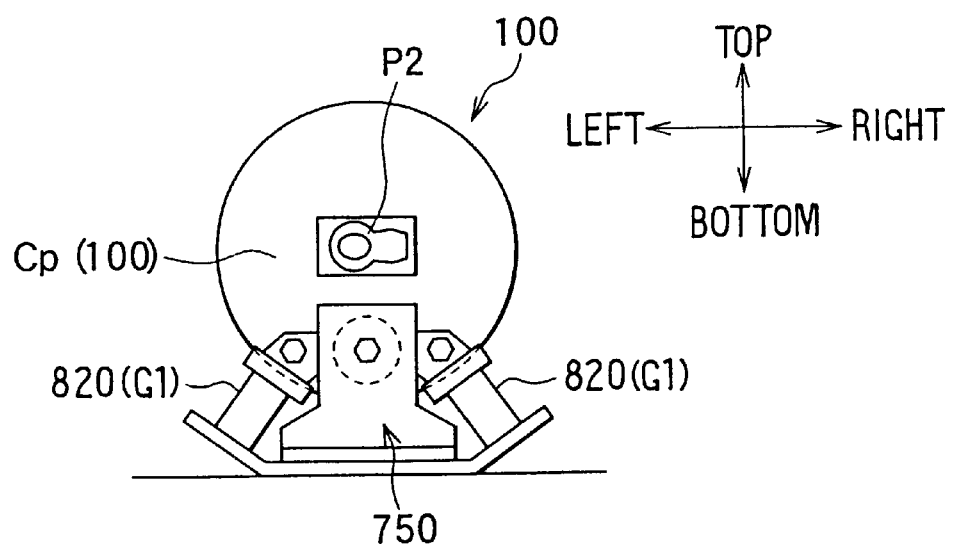
FIG. 14B is a side view taken from arrow XIVB in FIG. 14A.
Figure 15:
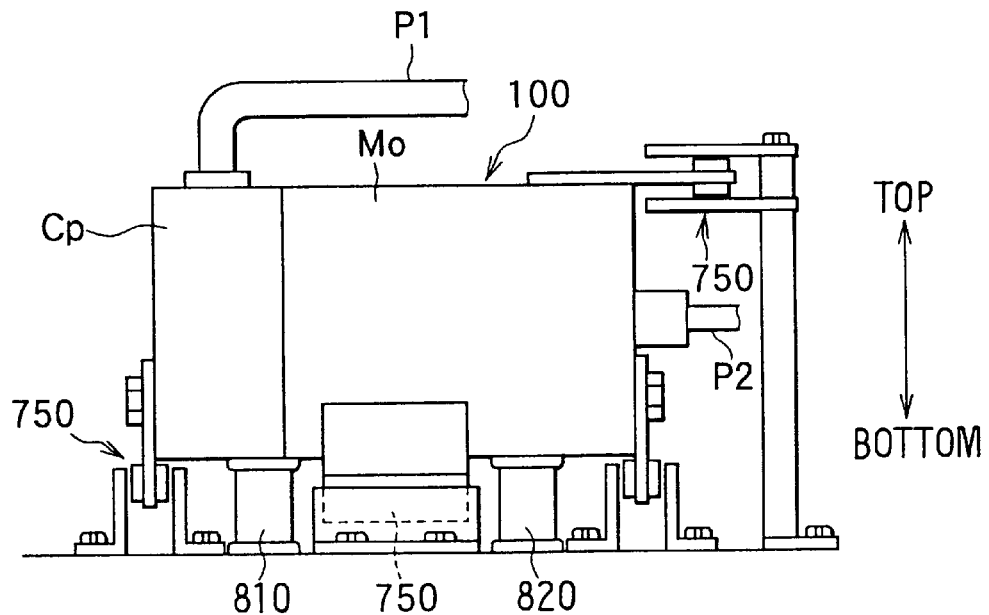
FIG. 15 is a front view showing a compressor mounted to a vehicle according to a modification of the fifth embodiment.

In the fifth embodiment, as shown in FIGS. 14A and 14B, a first support member 810 for holding the compression unit Cp and a second support member 820 for holding the motor Mo are made of a rubber elastic member G1. Further, a displacement restriction member 750 is connected to each end portion of the compressor 100 in an axial direction to restrict the displacement of the compressor 100 with respect to the vehicle body 600 from exceeding a maximum allowable displacement. When the compressor 100 is displaced by the maximum allowable displacement, each of the inlet pipe P1 and the outlet pipe P2 is applied with a maximum allowable stress. The displacement restriction member 750 includes a rubber elastic member G2 and a metal vibration restriction bracket 751. The elastic member G2 has a hardness larger than that of the elastic member G1, and is disposed between the vibration restriction bracket 751 and the compressor 100. In the fifth embodiment, the elastic member G1 has a hardness of approximately IRHD 40–45, and the elastic member G2 has a hardness of approximately IRHD 50.

Generally, the passenger of the vehicle feels discomfort due to vibration of the compressor 100. Further, displacement of the compressor 100 with respect to the vehicle body 600 caused by vibration of the vehicle applies stress to the inlet pipe P1 and the outlet pipe P2. Therefore, when the hardness of the elastic member G1 is appropriately set so that the first and second support members 810 and 820 absorb vibration of the compressor 100, the passenger is insulated from the vibration of the compressor 100. However, when the hardness of the elastic member G1 is set so that the first and second support members 810 and 820 absorb vibration of the compressor 100, the hardness of the elastic member G1 is relatively small. As a result, the compressor 100 may vibrate due to vibration of the vehicle, and may be greatly displaced with respect to the vehicle body 600.

According to the fifth embodiment, the displacement restriction member 750 restricts the displacement of the compressor 100 from exceeding the maximum allowable displacement. As a result, the inlet pipe P1 and the outlet pipe P2 are insulated from a large amount of stress. Thus, in the fifth embodiment, vibration of the compressor 100 is restricted from being transmitted to the vehicle, and the inlet pipe P1 and the outlet pipe P2 are not fatigued. In the fifth embodiment, the hardness of the elastic member G1 is set so that resonance frequency of a vibration system including the compressor 100 and the first and second support members 810, 820 is from $\frac{1}{3}$ to $\frac{1}{2}$ of the resonance frequency of the vehicle body 600. Further, as shown in FIG. 15, the displacement restriction member 750 may be connected to the compressor 100 in two directions perpendicular to the axial direction of the compressor 100; that is, a vertical direction and a front-rear direction of the compressor 100.

(Sixth Embodiment)

A sixth preferred embodiment of the present invention will be described with reference to FIGS. 16A and 16B.

Figure 16A:
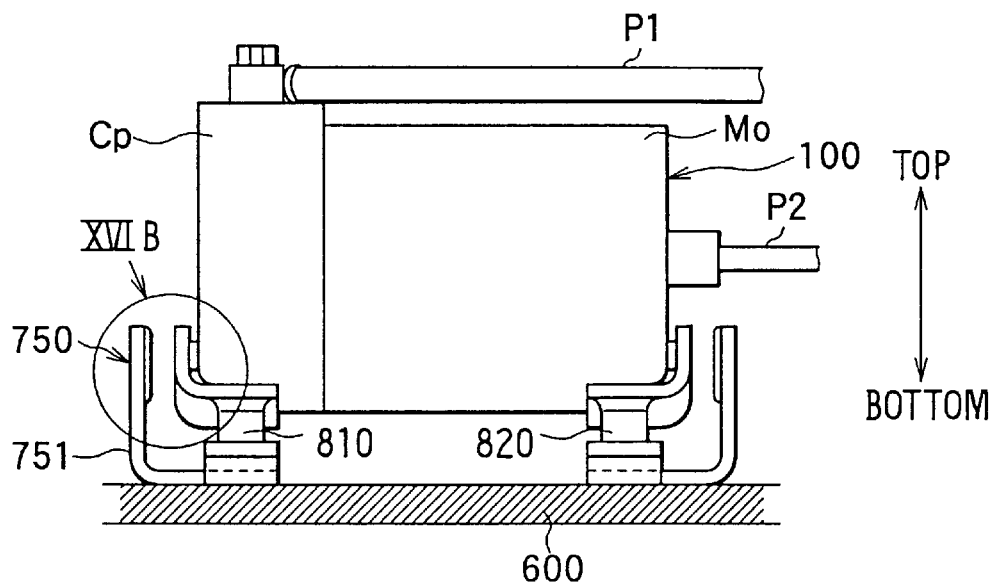
FIG. 16A is a front view showing a compressor mounted to a vehicle according to a sixth preferred embodiment of the present invention.
Figure 16B:
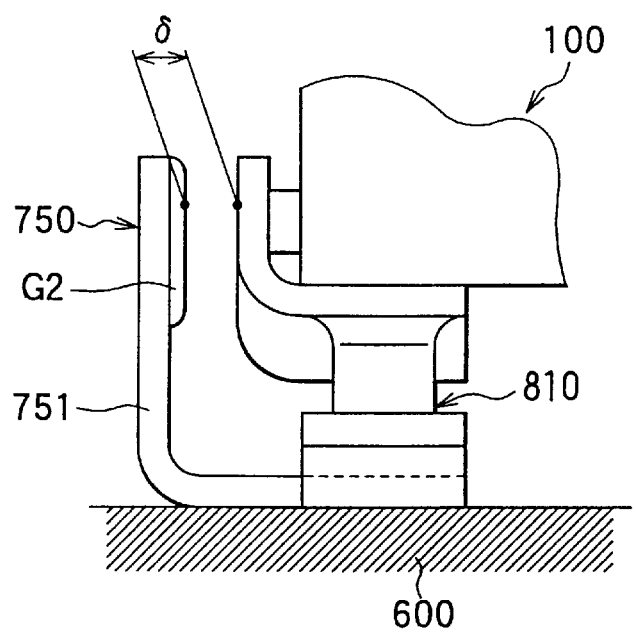
FIG. 16B is an enlarged view showing a portion indicated by arrow XVIB in FIG. 16A.

In the sixth embodiment, as shown in FIGS. 16A and 16B, the elastic member G2 in the fifth embodiment is omitted or reduced in size to form a gap δ, which corresponds to the maximum allowable displacement.

According to the sixth embodiment, as with the fifth embodiment, vibration of the compressor 100 is restricted from being transmitted to the vehicle, and the inlet pipe P1 and the outlet pipe P2 are not broken due to fatigue.

Figure 17:
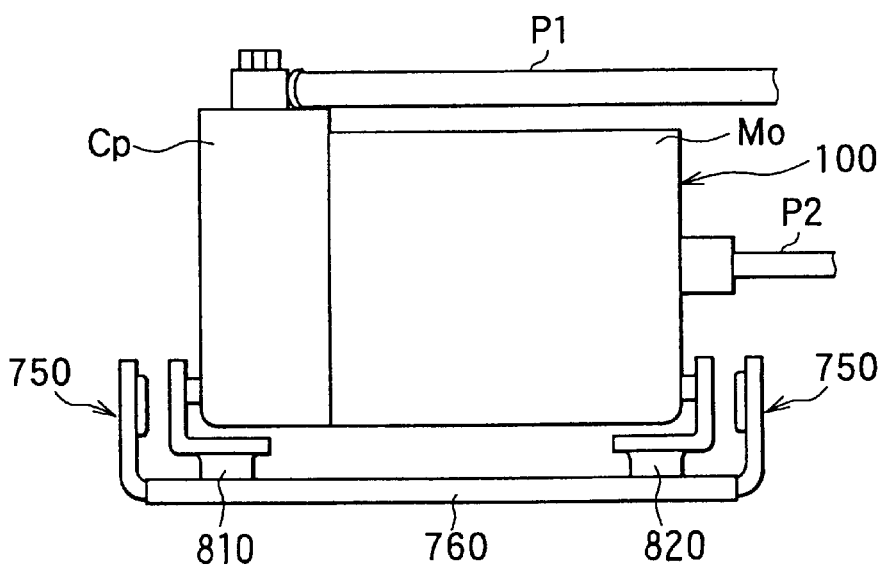
FIG. 17 is a front view showing a compressor mounted to a vehicle according to a modification of the fifth and sixth embodiments.

In the fifth and sixth embodiments, as shown in FIG. 17, the first and second support members 810, 820 and the displacement restriction member 750 may be secured to the vehicle body 600 through a bracket 760 connected to the vehicle.

In the above-mentioned first through sixth embodiments, the compression unit Cp may be a rotary-type compression unit.

Further, the present invention is not limited to a compressor having a substantially horizontal axis, but may be applied to a compressor having an axis extending in any other direction such as a substantially vertical direction.

Although the present invention has been fully described in connection with preferred embodiments thereof with reference to the accompanying drawings, it is to be noted that various changes and modifications will become apparent to those skilled in the art. Such changes and modifications are to be understood as being within the scope of the present invention as defined by the appended claims.

What is claimed is:

1. A mounting structure for mounting a compressor to a vehicle body, the compressor having a fluid compression unit and a motor integrally connected to the compression unit for driving the compression unit, the mounting structure comprising;

a support member disposed between the compressor and the vehicle body, the support member including a first elastically deformable member which restricts vibration of the compressor from being transmitted to the vehicle body; and a displacement restriction member for restricting a displacement of the compressor with respect to the vehicle body from exceeding a predetermined displacement value; wherein:

the displacement restriction member includes a first bracket provided on the compressor, a second bracket provided on the vehicle body, and a second elastically deformable member provided therebetween, the first bracket faces the second bracket in a direction being generally horizontal in parallel with the vehicle body, and the second elastically deformable member absorbs a mechanical shock when the first bracket collides with the second bracket in the direction being in parallel with the vehicle body for restricting the displacement of the compressor with respect to the vehicle body.

2. The mounting structure according to claim 1, wherein the displacement restriction member includes a gap corresponding to the predetermined displacement value.

3. The mounting structure according to claim 1, wherein an elastic coefficient of the first elastically deformable member is smaller than that of the second elastically deformable member.

4. The mounting structure according to claim 1, wherein a resonance frequency of the compressor and the support member is between $\frac{1}{3}$ and $\frac{1}{2}$ of a resonance frequency of the vehicle.

5. The mounting structure according to claim 1, further comprising a bracket connected to the vehicle, wherein the support member and the displacement restriction member are secured to the vehicle through the bracket.

* * * * *